Patented Oct. 17, 1933

1,930,664

UNITED STATES PATENT OFFICE 1,930,664

PROCESS FOR THE RECOVERY OF FREE CHLORINE FROM CHLORIDES

Ludwig Rosenstein, San Francisco, Calif., assignor to Shell Development Company, San Francisco, Calif., a corporation of Delaware No Drawing. Application September 4, 1931
Serial No. 561,305

20 Claims. (Cl. 23—219)

This invention relates to the preparation of substantially pure anhydrous chlorine and other valuable products, and more particularly consists of a process whereby chlorine is recovered from chlorides of alkali or alkaline-earth metals with formation of nitrosyl chloride as an intermediate product.

In the process about to be described, I treat the aforementioned alkalinous chlorides directly to displace the chloride radical by a nitrate group; treat the gaseous products of this reaction in the manner disclosed hereinafter to effect the separation of substantially pure and anhydrous chlorine from the mixture of said gaseous products, and ultimately recover the treating agents to return them to the process.

In general, this method of producing substantially pure chlorine can be used wherever nitrosyl chloride is formed as a result of chemical reaction. For the purposes of illustration, I shall describe my process in connection with the recovery of chlorine from potassium chloride; it is to be understood that the procedure, with only minor variations, which will be apparent to the skilled chemist, is applicable to other chlorides, and especially for conversion of alkalinous chlorides, under which term are included chlorides of alkali and alkaline-earth metals.

Dry solid potassium chloride reduced to about 100 mesh is treated at ordinary temperature with a stream of nitrogen peroxide gas whereby the following reaction is brought about:

$$KCl + 2NO_2 \rightarrow KNO_3 + NOCl \quad \text{(1)}$$

The reaction may not go to completion because the surface of the potassium chloride becomes covered with a layer of nitrate which prevents access thereto of fresh quantities of nitrogen peroxide gas. By mechanical means, such as agitation, of exposing new surfaces of potassium chloride, however, the reaction may be caused to become substantially complete. I prefer to carry this reaction out in the substantial absence of moisture to insure the purity of the recovered chlorine, as well as the higher concentration of valuable potassium nitrate.

The exit gas from the reaction vessel may consist of substantially pure nitrosyl chloride, or it may contain besides this the excess of nitrogen peroxide. These gases are brought into intimate contact with a mixture of concentrated sulfuric and nitric acids in a scrubbing tower whereby the following reaction is brought about:

$$2NOCl + 3H_2SO_4 + HNO_3 \rightarrow$$
$$3HSO_4NO + Cl_2 + 2H_2O \quad \text{(2)};$$

any nitrogenoxides carried along with the nitrosyl chloride are also absorbed to form nitrosyl sulfuric acid. Therefore, the exit gas from this scrubbing operation consists of chlorine containing no greater moisture content than corresponds to the vapor pressure of water held by the concentrated sulfuric acid and very small amounts of oxides of nitrogen corresponding to the vapor pressure of these from nitrosyl sulfuric acid.

Instead of adding nitric acid to the sulfuric acid for absorption, the object can also be accomplished by admixing nitrogen peroxide with the gaseous nitrosyl chloride in the ratio 1:1 and passing this mixture through concentrated sulfuric acid; the reaction which takes place is:

$$4H_2SO_4 + 2NOCl + 2NO_2 \rightarrow$$
$$4HSO_4NO + Cl_2 + 2H_2O \quad \text{(3)}$$

the products being identical with those from reaction (2). When employing this process as heretofore described, the amount of the nitrogen peroxide passing with nitrosyl chloride to the absorber may be controlled by adjusting the feed of this gas to the chloride converter so that sufficient excess of it is available for reaction (3). It is preferable to carry out this absorption reaction at a low temperature and in the presence of a considerable excess of sulfuric acid, under which conditions the stability of nitrosyl sulfuric acid is greatly increased.

The chlorine gas from the absorber is substantially pure and anhydrous, needs no further treatment and is ready for storage or suitable use.

The process of decomposition of nitrosyl chloride and absorption of nitrogen oxides accompanied by liberation of free chlorine may be made cyclic in operation, as nitrosyl sulfuric acid can be decomposed by heating in accordance with the equation:

$$3HSO_4NO + 1\tfrac{1}{2}H_2O \rightarrow 3H_2SO_4 + 1\tfrac{1}{2}N_2O_3 \quad \text{(4)};$$

sulfuric acid is then returned to the absorber, while nitrogen trioxide is further oxidized to nitrogen peroxide and admixed with the gas fed to the converter.

The intermediate step of the formation of nitrosyl chloride as shown in reaction (1) can be somewhat modified by changing the operating conditions without causing a change in composition of the resulting products. Thus, instead of using gaseous nitrogen peroxide, as has been described, this normally gaseous substance can be liquefied and used in liquid form to react with dry solid alkalinous chlorides, whereby a mixture of nitrosyl chloride and oxides of nitrogen if desired is produced and becomes available for further treatment.

Another modification of this step may involve the use of fused chlorides, in which case the course of reaction (1) is not substantially changed.

The initial step of displacement of the chlorine atom or atoms from chlorides by the nitrate group can also be successfully accomplished by the old method which involves digesting chlorides with concentrated nitric acid at elevated temperatures; the following equation represents the course of the chemical reaction:

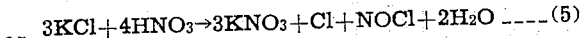

$$3KCl + 4HNO_3 \rightarrow 3KNO_3 + Cl + NOCl + 2H_2O \quad (5)$$

This reaction may be modified by passing nitrogen oxides through the reacting mixture of nitric acid, and chloride; this modification has the advantage of continuous regeneration of nitric acid as the water of reaction shown on the right side of the equation (5) combines with the added oxides of nitrogen.

When an aqueous system is involved in the primary reaction, the gaseous reaction products may contain HCl, but this will also react with $HNO_3$ or $NO_2$ in concentrated sulfuric acid to give chlorine and nitrosyl sulfuric acid.

The direct industrial applications of the mixture of gaseous products of reactions (1) and (5) are very limited and it is very advantageous to have these gases subjected to a treatment herein described whereby substantially dry pure chlorine is produced and separated oxides of nitrogen become available for reuse in transformation of chlorides into nitrates.

I claim as my invention:

1. A process for the preparation of elementary chlorine and other valuable products, comprising; contacting a mixture containing nitrosyl chloride with concentrated sulfuric acid in the presence of nitrogen peroxide, and recovering the elementary chlorine thereby liberated.

2. A process for the preparation of elementary chlorine and other valuable products, comprising: reacting oxides of nitrogen with alkalinous chlorides so that nitrosyl chloride is evolved, treating the nitrosyl chloride-containing fluid mixture with concentrated sulfuric acid in the presence of a member of the group consisting of nitric acid and nitrogen peroxide, and recovering the elementary chlorine thereby liberated.

3. A process for the preparation of elementary chlorine and other valuable products, comprising: reacting gaseous oxides of nitrogen with alkalinous chlorides so that nitrosyl chloride is evolved, treating the nitrosyl chloride-containing fluid mixture with concentrated sulfuric acid in the presence of a member of the group consisting of nitric acid and nitrogen peroxide, and recovering the elementary chlorine thereby liberated.

4. A process for the preparation of elementary chlorine and other valuable products, comprising: reacting liquid oxides of nitrogen with alkalinous chlorides so that nitrosyl chloride is evolved, treating the nitrosyl chloride-containing fluid mixture with concentrated sulfuric acid in the presence of a member of the group consisting of nitric acid and nitrogen peroxide, and recovering the elementary chlorine thereby liberated.

5. A process for the preparation of elementary chlorine and other valuable products, comprising: reacting substantially pure oxides of nitrogen with alkalinous chlorides so that nitrosyl chloride is evolved, treating the nitrosyl chloride-containing fluid mixture with concentrated sulfuric acid in the presence of a member of the group consisting of nitric acid and nitrogen peroxide, and recovering the elementary chlorine thereby liberated.

6. A process for the preparation of elementary chlorine and other valuable products, comprising: reacting oxides of nitrogen partly diluted with an inert gas with alkalinous chlorides so that nitrosyl chloride is evolved, treating the nitrosyl chloride-containing fluid mixture with concentrated sulfuric acid in the presence of a member of the group consisting of nitric acid and nitrogen peroxide, and recovering the elementary chlorine thereby liberated.

7. A process for the preparation of elementary chlorine and other valuable products, comprising: reacting oxides of nitrogen with dry, solid, finely divided alkalinous chlorides so that nitrosyl chloride is evolved, treating the nitrosyl chloride-containing fluid mixture with concentrated sulfuric acid in the presence of a member of the group consisting of nitric acid and nitrogen peroxide, and recovering the elementary chlorine thereby liberated.

8. A process for the preparation of elementary chlorine and other valuable products, comprising: reacting oxides of nitrogen with fused alkalinous chlorides so that nitrosyl chloride is evolved, treating the nitrosyl chloride-containing fluid mixture with concentrated sulfuric acid in the presence of a member of the group consisting of nitric acid and nitrogen peroxide, and recovering the elementary chlorine thereby liberated.

9. A process for the preparation of elementary chlorine and other valuable products, comprising: reacting concentrated nitric acid with alkalinous chlorides at about the boiling temperature of the mixture so that in the evolved gaseous mixture nitrosyl chloride is present, treating the mixture thus evolved with concentrated sulfuric acid in the presence of a member of the group consisting of nitric acid and nitrogen peroxide, and recovering the elementary chlorine issued from the absorber.

10. A process for the preparation of elementary chlorine and other valuable products, comprising: reacting concentrated nitric acid with alkalinous chlorides at about the boiling temperature of the mixture so that in the evolved gaseous mixture nitrogen peroxide and nitrosyl chloride are present, treating the mixture thus evolved with concentrated sulfuric acid, and recovering the elementary chlorine issued from the absorber.

11. A process for the preparation of elementary chlorine and other valuable products, comprising: reacting concentrated nitric acid with alkalinous chlorides in the presence of oxides of nitrogen so that in the evolved gaseous mixture nitrosyl chloride is present, treating the mixture thus evolved with concentrated sulfuric acid in the presence of a member of the group consisting of nitric acid and nitrogen peroxide, and recovering the elementary chlorine issued from the absorbed.

12. A process for the preparation of elementary chlorine and other valuable products, comprising: reacting concentrated nitric acid with alkalinous chlorides in the presence of oxides of nitrogen so that in the evolved gaseous mixture nitrogen peroxide and nitrosyl chloride are present, treating the mixture thus evolved with concentrated sulfuric acid, and recovering the elementary chlorine issued from the absorber.

13. A process for the preparation of elementary chlorine and other valuable products, comprising: reacting oxides of nitrogen with alkali-metal chlorides so that nitrosyl chloride is evolved, treating the nitrosyl chloride containing fluid mixture with concentrated sulfuric acid in the presence of a member of the group consisting of nitric acid and nitrogen peroxide, and recovering the elementary chlorine thereby liberated.

14. A process for the preparation of elementary chlorine and oxides of nitrogen, comprising: contacting a mixture containing nitrosyl chloride with concentrated sulfuric acid in the presence of nitrogen peroxide, recovering elementary chlorine thereby liberated, heating the mixture containing nitrosyl sulfuric acid and water, and recovering oxides of nitrogen thereby liberated.

15. A process for the preparation of elementary chlorine and other valuable products, comprising: reacting oxides of nitrogen with alkalinous chlorides so that nitrosyl chloride is evolved, treating the nitrosyl chloride-containing fluid mixture with concentrated sulfuric acid in the presence of a member of the group consisting of nitric acid and nitrogen peroxide, recovering the elementary chlorine thereby liberated, heating the mixture containing nitrosyl sulfuric acid and water, and recovering oxides of nitrogen thereby liberated.

16. A process for the preparation of elementary chlorine and other valuable products, comprising: reacting concentrated nitric acid with alkalinous chlorides in the presence of oxides of nitrogen so that in the evolved gaseous mixture nitrosyl chloride is present, treating the mixture thus evolved with concentrated sulfuric acid in the presence of a member of the group consisting of nitric acid and nitrogen peroxide, recovering the elementary chlorine issued from the absorber, heating the mixture containing nitrosyl sulfuric acid and water, and recovering oxides of nitrogen thereby liberated.

17. A process for the preparation of elementary chlorine and other valuable products, comprising: reacting oxides of nitrogen with alkali-metal chlorides so that nitrosyl chloride is evolved, treating the nitrosyl chloride-containing fluid mixture with concentrated sulfuric acid in the presence of a member of the group consisting of nitric acid and nitgrogen peroxide, recovering the elementary chlorine thereby liberated, heating the mixture containing nitrosyl sulfuric acid and water, and recovering oxides of nitrogen thereby liberated.

18. A process for the preparation of elementary chlorine and other valuable products, comprising: reacting concentrated nitric acid with alkali-metal chlorides in the presence of oxides of nitrogen so that in the evolved gaseous mixture nitrosyl chloride is present, treating the mixture thus evolved with concentrated sulfuric acid in the presence of a member of the group consisting of nitric acid and nitrogen peroxide, recovering the elementary chlorine issued from the absorber, heating the mixture containing nitrosyl sulfuric acid and water, and recovering oxides of nitrogen thereby liberated.

19. A process for the preparation of elementary chlorine and other valuable products, comprising: reacting oxides of nitrogen with alkalinous chlorides so that nitrosyl chloride is evolved, treating the nitrosyl chloride-containing fluid mixture with concentrated sulfuric acid in the presence of a member of the group consisting of nitric acid and nitrogen peroxide, recovering the elementary chlorine thereby liberated, heating the mixture containing nitrosyl sulfuric acid and water, recovering oxides of nitrogen thereby liberated, and returning said oxides of nitrogen to the process.

20. A process for the preparation of elementary chlorine and other valuable products, comprising: reacting concentrated nitric acid with alkalinous chlorides in the presence of oxides of nitrogen so that in the evolved gaseous mixture nitrosyl chloride is present, treating the mixture thus evolved with concentrated sulfuric acid in the presence of a member of the group consisting of nitric acid and nitrogen peroxide, recovering the elementary chlorine issued from the absorber, heating the mixture containing nitrosyl sulfuric acid and water, recovering oxides of nitrogen thereby liberated, and returning said oxides of nitrogen to the process.

LUDWIG ROSENSTEIN.